United States Patent
Anft et al.

(10) Patent No.: US 7,146,005 B1
(45) Date of Patent: Dec. 5, 2006

(54) INPUT ELEMENT FOR A TELEPHONE

(75) Inventors: Michael Anft, Heinrichshofen (DE);
Bernd Holz auf der Heide, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/070,890

(22) PCT Filed: Apr. 17, 2000

(86) PCT No.: PCT/DE00/01202

§ 371 (c)(1),
(2), (4) Date: Mar. 6, 2002

(87) PCT Pub. No.: WO01/19057

PCT Pub. Date: Mar. 15, 2001

(30) Foreign Application Priority Data

Sep. 6, 1999 (DE) ................................ 199 42 448

(51) Int. Cl.
*G09G 5/08* (2006.01)
*H04B 1/38* (2006.01)
*H04M 1/00* (2006.01)

(52) U.S. Cl. ................ 379/433.06; 345/157; 345/163; 345/184; 455/566

(58) Field of Classification Search ........... 379/433.07, 379/433.06, 368, 433.1; 345/163, 156, 157, 345/167, 184; 349/61; 368/15, 13; 455/566
See application file for complete search history.

(56) References Cited

U.S. PATENT DOCUMENTS

| | | | | |
|---|---|---|---|---|
| 5,912,661 | A | * | 6/1999 | Siddiqui ..................... 345/166 |
| 6,075,518 | A | * | 6/2000 | Pruchniak ................... 345/163 |
| 6,108,277 | A | * | 8/2000 | Whitmore .................... 368/15 |
| 6,128,006 | A | * | 10/2000 | Rosenberg et al. ......... 345/163 |
| 6,359,668 | B1 | * | 3/2002 | Iijima et al. ................. 349/61 |

FOREIGN PATENT DOCUMENTS

| | | |
|---|---|---|
| EP | 0 797 336 | 9/1997 |
| EP | 1 028 570 | 8/2000 |
| WO | WO 97/16912 | 5/1997 |

* cited by examiner

*Primary Examiner*—Harry S. Hong
(74) *Attorney, Agent, or Firm*—Bell, Boyd & Lloyd LLC

(57) ABSTRACT

An input element for a telephone for inputting data having two rotary functions in respectively opposite directions, and which also has two key functions which are independent of the rotary functions, the key functions being triggered by a movement in a plane substantially perpendicular to the plane of the rotary movement. In addition, the input element preferably being coupled to a display with menu items or numbers being arranged essentially on a circle.

11 Claims, 5 Drawing Sheets

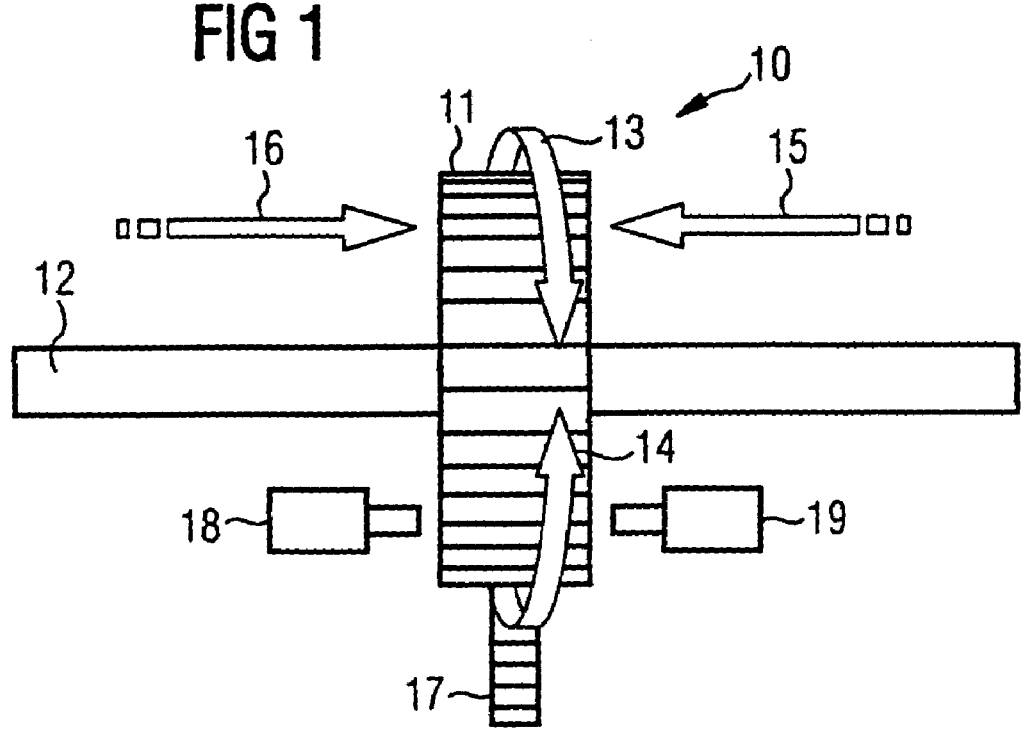
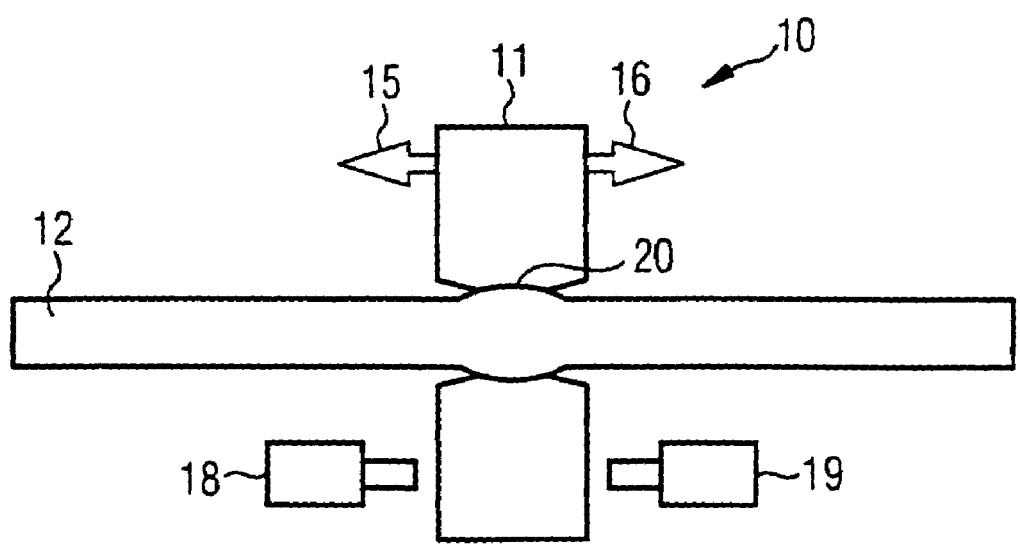

INPUT ELEMENT FOR A TELEPHONE

BACKGROUND OF THE INVENTION

The present invention relates to an input element or dialing element and an input device for a telephone; in particular, for a mobile telephone.

Dialing elements or operator controls both for a key telephone and a mobile telephone are known. Usually, the input or selection of menu items and/or numbers is made using a 12-key block and further keys for selecting other functions. The selection of the other functions is frequently made by sequentially pressing a key or a pair of keys (for example, by sequentially scrolling up or down), and then selecting via cursor keys.

A further known form of operator control of a mobile telephone is to use what is referred to as a Jog Dial, such as is implemented, for example, in newer mobile telephones from Sony and is described in the publication EP-A-0 797 336. Here, the Jog Dial is an actuator wheel which is arranged in the mobile telephone and has a rotary function and a pressing function. For example, by rotating the Jog Dial actuator wheel, it is possible to scroll through a menu or the numbers 0–9, a confirmation of selection function of the function or number which is selected by the rotary movement being implemented by pressing on the wheel in the radial direction. The disadvantage with this solution is that this form of input takes too long, particularly in the case of relatively long telephone numbers, and leads to a comparatively high level of cognitive and motor stress.

Interactive displays are also proposed for miniaturized devices. In the document WO97/16912, a wrist watch with such a display is described. A disadvantage here is that, in order to activate individual points which are illustrated on the display, an additional pin is appropriately used (cf. page 2, lines 10 et seq.) in order, for example, to keep the size of the menu items small.

In addition, inputting or control by voice input is a further possible way of inputting data. For miniaturized devices, this form has not yet become ready for introduction to the market or is technically and financially still too costly.

Generally, the course of further miniaturization, the area on information and communications terminals, for example GSM and DECT telephones, which is available for the user interface is becoming smaller and smaller so that on future devices there will no longer be any space for the traditional twelve key block.

The present invention is, therefore, directed toward an input element and an input device which requires less space and avoids the disadvantages of the Jog Dial.

SUMMARY OF THE INVENTION

Thus, the input element according to the present invention has an input which includes a rotary function in two directions (i.e., forward and backward), and two key functions. The directions of movement for generating the key functions are arranged in a plane perpendicularly to the plane of rotation and are opposed to one another. According to the present invention, the input is formed by an actuator wheel which is capable of being tilted out of the plane of rotary movement on each side by exerting an appropriate pressure so that it is possible to speak of a pressing function or tilting function. The tilting causes an appropriate device to generate a signal, so that two possible signals are available.

The visualization or acknowledgement of the selection via elements which are provided in a circular shape (for example, illuminated numbers), in a way analogous to the rotary movement of the actuator wheel, is largely self-explanatory and promotes the generation of sensomotive abilities on the part of the user, which makes using the device easier overall in cognitive terms and faster in motor terms.

The movement of the actuator wheel is preferably freely rotating or provided with a stop, the rotary movement being capable of being latched or non-latched. These further features are respectively dependent on the particular application.

In addition, the input device according to the present invention which includes an actuator wheel can be coupled to a display to an input device, which display is cognitively compatible with the rotary movement of the actuator wheel. The display preferably has a large area, particularly circular, on which the respective menus, submenus, menu items or numbers are arranged substantially on a circle so that a direct assignment is provided between the display and the actuator wheel for the user. The combination of the rotary movement of the actuator wheel and the display which is matched thereto facilitates and speeds up the selection and input operation and reduces perception errors.

For example, the selected entry or the selected number which are respectively represented on the display preferably can be actuated by pressing on one side of the actuator wheel transversely to the direction of rotation; i.e., with a first key function. By pressing on the other side of the actuator wheel transversely to the direction of rotation, it is possible to trigger a further function; for example, exiting from a menu (ESC) or the deletion of a character (Backspace) with a second key function.

The advantages of the solution according to the present invention are as follows:

Reduction of the space required in comparison with the traditional key solutions such as, for example, the 12-digit key block; and reduction of the probability of incorrect operator control operations such as frequently occur with an actuator wheel solution with a pressing function in the direction of rotation because the rotation of the actuator wheel always exerts a pressure in the axial direction of the actuator wheel which, under certain circumstances, triggers the key function. The complete decoupling of the rotary functions from the two pressing functions or key functions prevents inadvertent triggering of the key function. In addition, the display of the current selection via the circular arrangement is more concise and less easily confused than in known solutions.

In comparison with conventional actuator wheel solutions, a further key function is available as a result of which current dialog prompting, such as "Cursor up/down" or "OK" and "Escape", can be implemented without the arrangement of a further key which is difficult to operate or a complex Help structure, such as "Escape" as an illustrated menu item, permitting the solution according to the present invention to provide significantly more convenient user prompting. The input device according to the present invention, therefore, integrates all the elements required for convenient user prompting in one input element.

Additional features and advantages of the present invention are described in, and will be apparent from, the following Detailed Description of the Invention and the Figures.

BRIEF DESCRIPTION OF THE FIGURES

FIG. 1 shows a basic view of the input element according to the present invention.

FIG. 2 shows a detailed view of a possible way of supporting the actuator wheel of the input element in FIG. 1.

DETAILED DESCRIPTION OF THE INVENTION

Figure 3:
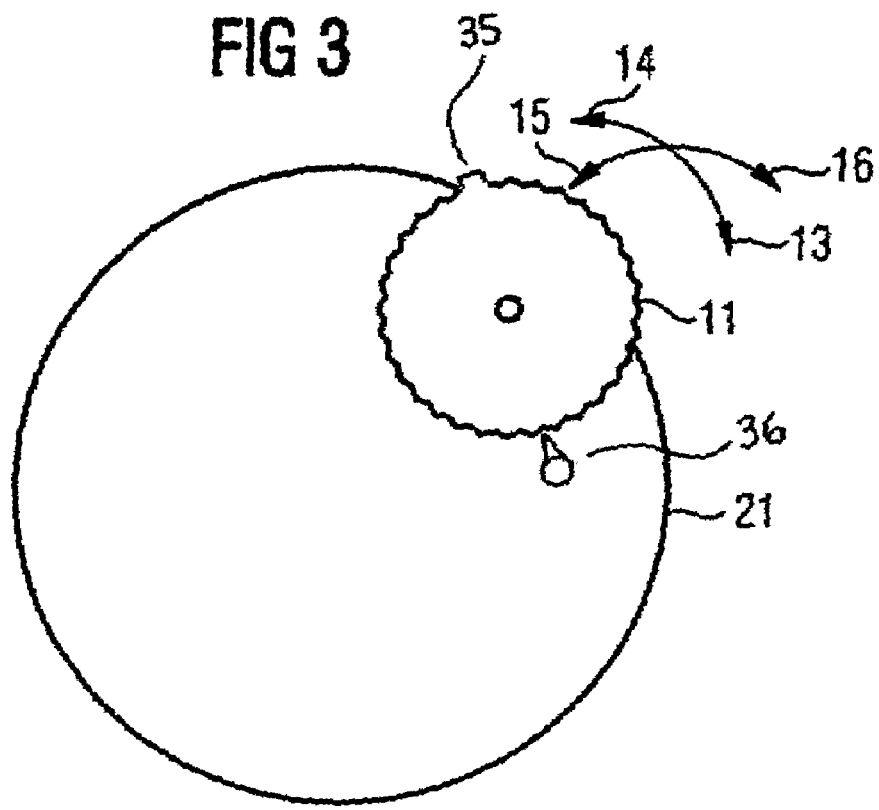
FIG. 3 shows the arrangement of an input element in a round housing.

FIG. 1 shows an input element according to the present invention which has an actuator wheel 11 which serves as the input. The actuator wheel 11 preferably is provided with ribbing. The actuator wheel is supported on an axle 12 and can rotate in two opposite directions 13 and 14. In addition, the actuator wheel 11 can be tilted into a plane which is substantially perpendicular to the plane of the rotary movement. In other words, the actuator wheel 11 can be moved in the opposite directions 15 and 16; i.e., displaced or tilted by applying pressure. A pickup or sensor 17 is provided for determining the rotary movement. This pickup for the measure and the direction of the rotary movement can be formed by a further actuator wheel. Other sensors which are based on electrical and/or optical methods can be used. Sensors 18 and 19 are arranged on each side of the actuator wheel 11 in order to determine the pressing movement or tilting of the actuator wheel. These sensors can be, for example, momentary contact switches. Other sensors which are based on electrical and/or optical methods also can be used.

FIG. 2 shows a cross section through the input element. In order to be able to implement the two momentary contact functions of the input element, the actuator wheel 11 is pivotably supported on the axle 12 via a ball and socket joint or ball bearing 20. For example, the ball and socket joint 20 can be provided by giving the axle 12 an substantially ball-shaped configuration. The maximum tilting angle can be defined by outwardly directed beveling of part of the internal face of the axle hole of the actuator wheel 11. In addition, the directions of the tilting movement or pressing movement 15 and 16 and the tilting sensors 18 and 19 are also shown.

FIG. 3 shows how the actuator wheel 11, which can be moved in four directions 13, 14, 15, 16, interacts with a circular display area of a circular mobile telephone 21. The movement of the actuator wheel 11 can occur in a non-latching (i.e. free) manner, or can alternately incorporate a latching mechanism, shown as reference 36 as an example, to provide latching movement during rotation. Also, a stop, shown as reference 35 as an example, may alternately be incorporated on actuator wheel 11 to restrict movement of the wheel during rotation.

Figure 4:
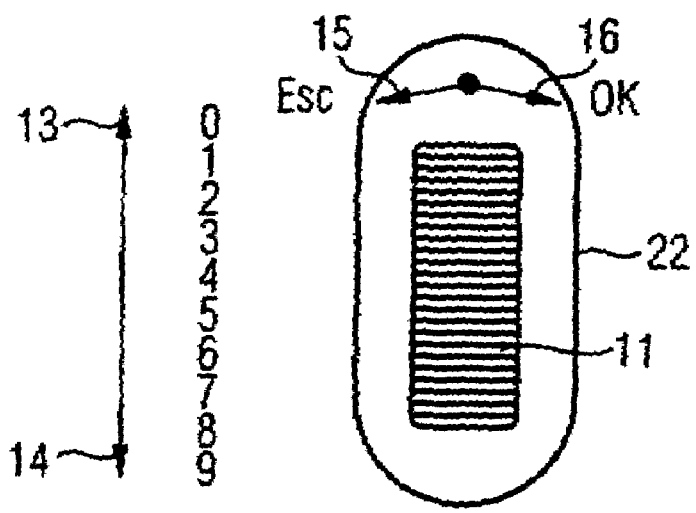
FIG. 4 shows a plan view of the installed input element in FIG. 3.

FIG. 4 shows a plan view of an actuator wheel 11 which is provided with a ribbing and has the directions of rotation 14 and 15, represented here by a two-ended arrow, and the tilting directions 15 and 16. The actuator wheel 11 is arranged here in a section 22 of a mobile telephone (not illustrated). For example, the numbers 0, 1, . . . , 9 can be actuated by turning in one direction 14, 15. Pressing the actuator wheel 11 in FIG. 4 to the left triggers Escape/Back, while pressing to the right triggers OK/Enter.

Figure 5:
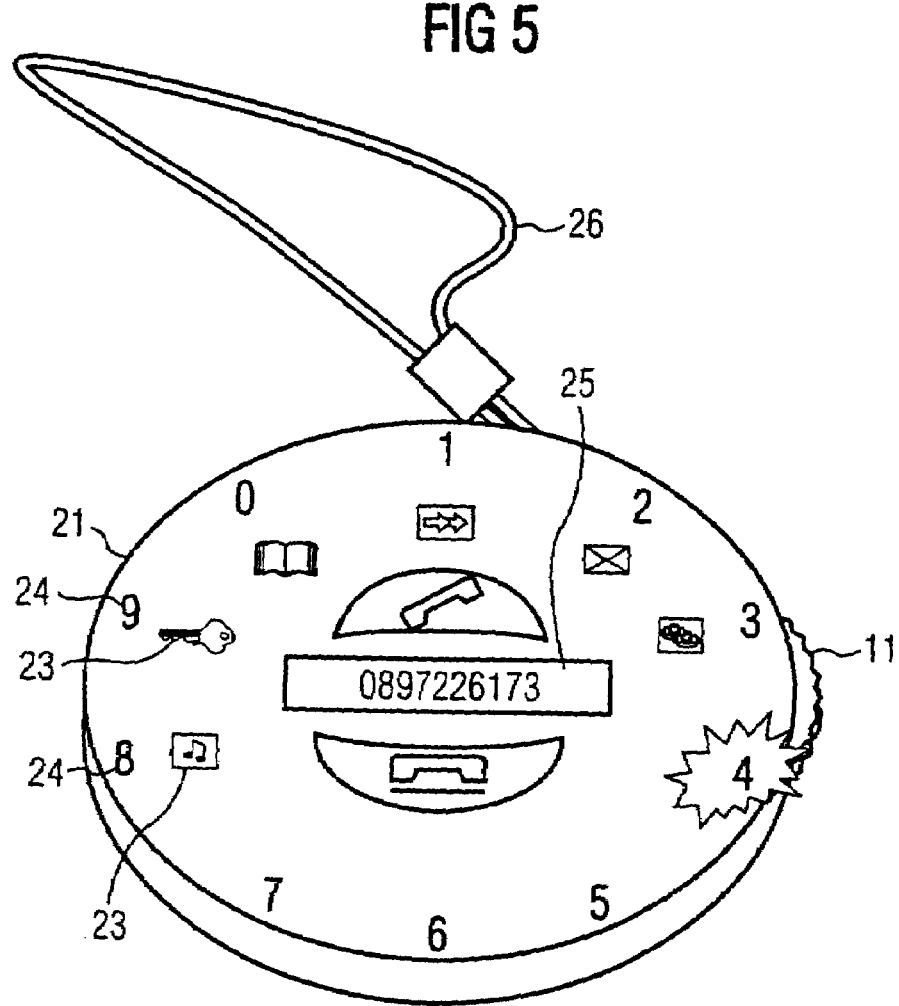
FIG. 5 shows a first embodiment of a mobile telephone with an "analog" display.

FIG. 5 shows a view of a first embodiment of a mobile telephone 21 with what is referred to as an "analog" selection display. The mobile telephone has a circular shape which is referred to below as a display area on which menu symbols 23 and numbers 24 are arranged. Here, both the menu symbols and the numbers 24 are each arranged on a circle. The numbers 24 and the menu symbols 23 are backlit (for example, via corresponding LEDs), when they are selected. The selection is made here via the input element which is arranged on the side of the mobile telephone 21, and from which part of the actuator wheel 11 projects, and is visible here. In the center of the display area of the mobile telephone 21, there is also a display 25 which serves, for example, for representing the selected numerical sequence. In addition, the mobile telephone 21 has a carrying cord which is embodied as an antenna 26.

Figure 6:
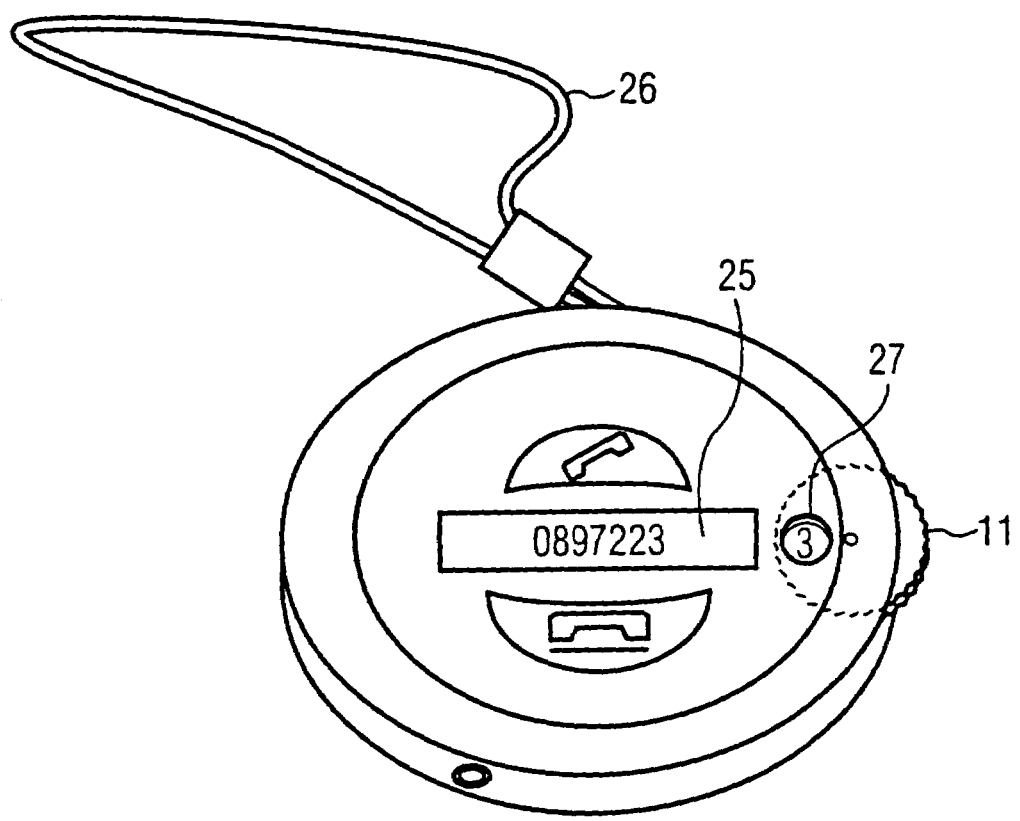
FIG. 6 shows a second embodiment of a mobile telephone with a "digital" display.

FIG. 6 shows a simplified version of a mobile telephone with what is referred to as a "digital" display. Here, only one selection display 27 is arranged on the display area of the mobile telephone 21. By turning and pressing the actuator wheel 11, a number or menu is selected and displayed on the display 25.

Figure 7:
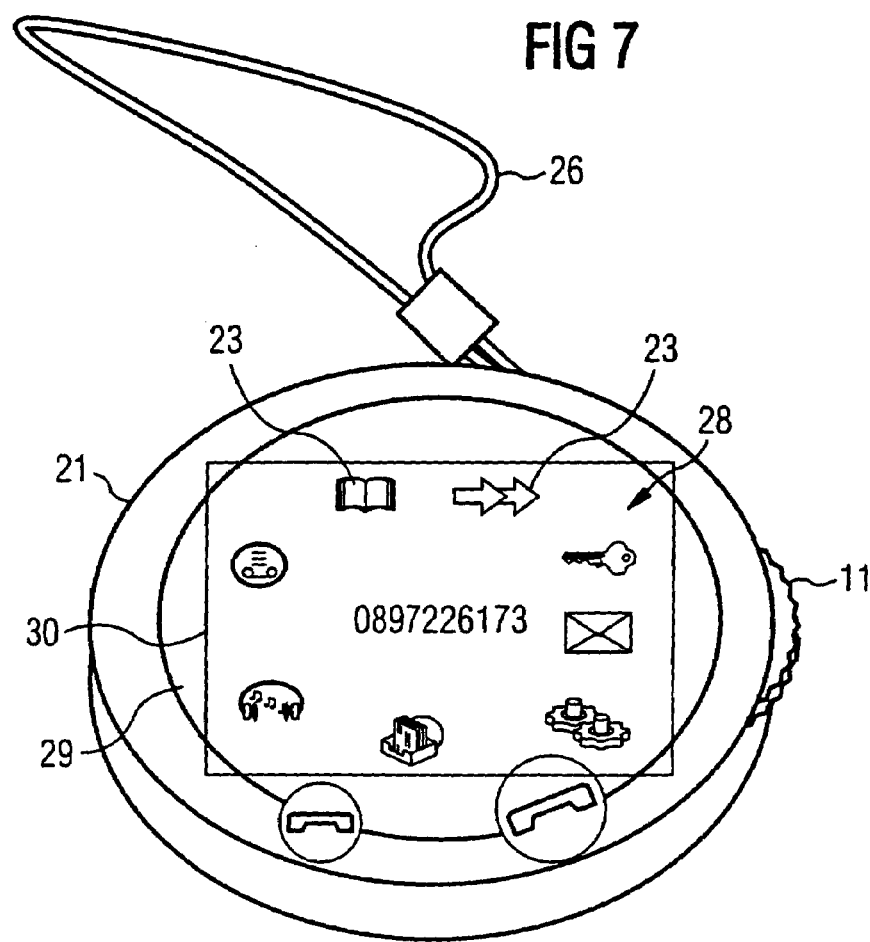
FIG. 7 shows a third embodiment of a mobile telephone with a display with a large area.

FIG. 7 shows a third embodiment of a circular mobile telephone 21. Here, the display area of the mobile telephone 21 is almost completely filled by a circular panel 29 which is formed by a filter, behind which a display 30 is arranged. On this display, the menu symbols 23 and the numbers (not illustrated here) are generated. The menu symbols 23 are also arranged on a circle here. The selection of a menu is performed via the laterally arranged actuator wheel 11. The display can be multi-colored in order to achieve better visualization. One variant of this solution consists in only a small display for displaying the numbers being located behind the filter 29, and the menu symbols 23 being arranged directly on the filter 29, in which case they can be illuminated separately by an illumination device, such as LEDs, in order to clarify and display the respective selection.

Figure 8:
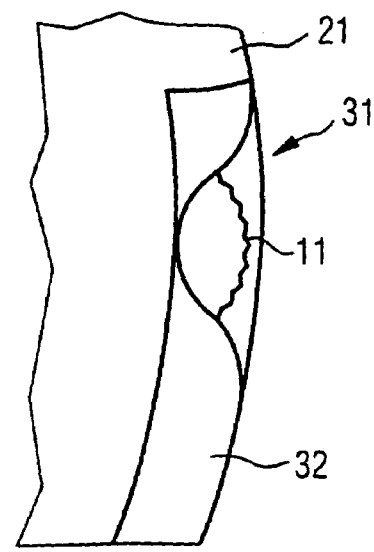
FIG. 8 shows a further possible way of arranging the input element in a mobile telephone.

FIG. 8 shows an embodiment of a mobile telephone 21 in which the actuator wheel is arranged in a recess 31 in the mobile telephone 21. In addition, a displaceable cover 32 is present. When the mobile telephone 21 is not in use, the cover can be pushed over the actuator wheel which is arranged in a countersunk fashion so that the actuator wheel 11 is protected. In addition, a use lock of the actuator wheel can be connected to the cover.

Although the present invention has been described with reference to specific embodiments, those of skill in the art will recognize that changes may be made thereto without departing from the spirit and scope of the invention as set forth in the hereafter appended claims.

The invention claimed is:

1. An input element for inputting data, comprising:
    an actuator wheel supported axially on a ball bearing to provide rotary movement of the actuator wheel in opposite directions along a plane of the bearing and to provide tilting movement of the actuator wheel out of the plane of the rotary movement on two sides of the bearing;
    sensors that determine the rotational and tilting movements of the actuator wheel; and a processing unit, operatively coupled to the sensors, wherein the processing unit executes:
- a rotary function for each determined rotational direction;
- a first key function that is independent of the rotary functions, the first key function being triggered by a determined tilting that is in the direction of a first side that is out of the plane of the rotary movement; and
- a second key function that is independent of the rotary functions, the second key function being triggered by a determined tilting function that is in the direction of a second side that is out of the plane of the rotary movement.

2. An input element for inputting data as claimed in claim 1, wherein two sensors arranged on each side of the actuator wheel within a tilting range.

3. An input element for inputting data as claimed claim 1, wherein the actuator wheel rotates in one of a latching and a non-latching fashion.

4. An input element for inputting data as claimed in claim 1, wherein the actuator wheel rotates in a freely running fashion.

5. An input element for inputting data as claimed in claim 1, wherein the actuator wheel is provided with a stop.

6. An input element for inputting data as claimed in claim 1, further comprising a further sensor for determining the rotary movement and direction.

7. An input device for inputting data on an input device, comprising:
an actuator wheel supported axially on a ball bearing to provide rotary movement of the actuator wheel in opposite directions along a plane of the bearing and to provide tilting movement of the actuator wheel out of the plane of the rotary movement on two sides of the bearing;
input means that determine the rotational and tilting movements of the actuator wheel, and executes:
- a rotary function for each determined rotational direction,
- a first key function that is independent of the rotary functions, the first key function being triggered by a determined tilting that is in the direction of a first side that is out of the plane of the rotary movement, and
- a second key function that is independent of the rotary functions, the second key function being triggered by a determined tilting function that is in the direction of a second side that is out of the plane of the rotary movement; and a display, wherein one or more of the executed functions are shown on the display.

8. An input device as claimed in claim 7, wherein the display device has a substantially circular area.

9. An input device as claimed in claim 7, wherein the executed functions are menu items and numbers and are arranged substantially along a circle within the display.

10. An input device as claimed in claim 7, wherein the display has at least two different colors.

11. An input device as claimed in claim 7, wherein the input device is part of a mobile telephone.

* * * * *